United States Patent
Kuttappan et al.

(10) Patent No.: US 9,953,541 B2
(45) Date of Patent: Apr. 24, 2018

(54) METHODS AND APPARATUS FOR OBTAINING AIRCRAFT LANDING GUIDANCE

(71) Applicant: HONEYWELL INTERNATIONAL INC., Morris Plains, NJ (US)

(72) Inventors: Sujith Kuttappan, Kerala (IN); Jitender Kumar Agarwal, UttarPradesh (IN)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 143 days.

(21) Appl. No.: 15/049,719

(22) Filed: Feb. 22, 2016

(65) Prior Publication Data

US 2017/0243497 A1   Aug. 24, 2017

(51) Int. Cl.
*G08G 5/02* (2006.01)
*B64D 45/04* (2006.01)

(52) U.S. Cl.
CPC ............. *G08G 5/025* (2013.01); *B64D 45/04* (2013.01)

(58) Field of Classification Search
CPC ........... G08G 5/025; G08G 5/02; B64D 45/04
See application file for complete search history.

(56) References Cited

U.S. PATENT DOCUMENTS

| | | | |
|---|---|---|---|
| 2,555,101 A | 5/1951 | Alvarez et al. | |
| 6,718,236 B1 | 4/2004 | Hammer et al. | |
| 7,626,513 B2 | 12/2009 | Goodman et al. | |
| 2003/0004641 A1* | 1/2003 | Corwin | G01S 13/782 701/301 |
| 2006/0265109 A1* | 11/2006 | Canu-Chiesa | B64D 43/00 701/3 |
| 2007/0061055 A1* | 3/2007 | Stone | G01S 13/913 701/2 |
| 2008/0243314 A1* | 10/2008 | Ridenour | G08G 5/0008 701/7 |
| 2015/0338853 A1* | 11/2015 | Casado Magana | G05D 1/0676 701/5 |
| 2016/0340056 A1* | 11/2016 | Mariani | G08G 5/0013 |
| 2016/0358481 A1* | 12/2016 | Vesely | G08G 5/02 |
| 2017/0018196 A1* | 1/2017 | Shay | G08G 5/045 |
| 2017/0032683 A1* | 2/2017 | Meserole, Jr. | G08G 5/0043 |

OTHER PUBLICATIONS

ACSS "SafeRoute®," Aviation Communication & Surveillance Systems, Product Brochure, 2015.
"Flight deck-based merging and spacing impact on flight crew operations during continuous descent arrivals and approaches," Digital Avionics Systems Conference, 2008. DASC 2008. IEEE/AIAA 27th, MITRE Corporation, Oct. 30, 2008.

* cited by examiner

*Primary Examiner* — Dale Moyer
(74) *Attorney, Agent, or Firm* — Lorenz & Kopf, LLP

(57) ABSTRACT

A method for receiving data onboard an aircraft is provided. The method obtains a plurality of aircraft transponder messages associated with a particular landing zone; extracts, from each of the plurality of aircraft transponder messages, aircraft position data associated with landing at least one lead aircraft at the particular landing zone; and determines a landing path for use by the aircraft to land at the particular landing zone, based on the extracted aircraft position data.

18 Claims, 5 Drawing Sheets

METHODS AND APPARATUS FOR OBTAINING AIRCRAFT LANDING GUIDANCE

TECHNICAL FIELD

Embodiments of the subject matter described herein relate generally to receiving landing guidance for an aircraft. More particularly, embodiments of the subject matter relate to receiving and interpreting lateral and vertical guidance information via an aircraft transponder.

BACKGROUND

Landing in an airport in poor visibility conditions is a challenge to any pilot. Current technology used to obtain lateral and vertical guidance for an aircraft during landing may include an instrument landing system (ILS), a Transponder Landing System (TLS), a microwave landing system, a Localizer Performance with Vertical guidance (LPV), a Ground-Based Augmentation System (GBAS), a global positioning system (GPS), or the like. Such aircraft systems are used to guide the flight crew to an appropriate touch down point at a particular location. However, both of the aforementioned aircraft systems (e.g., ILS and/or GPS) require functional ground and onboard equipment support to issue vertical and lateral deviation cues to the flight crew, which may not be available in every situation.

Accordingly, it is desirable to obtain vertical and lateral guidance information in alternative ways. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for receiving data onboard an aircraft. The method obtains a plurality of aircraft transponder messages associated with a particular landing zone; extracts, from each of the plurality of aircraft transponder messages, aircraft position data associated with landing at least one lead aircraft at the particular landing zone; and determines a landing path for use by the aircraft to land at the particular landing zone, based on the extracted aircraft position data.

Some embodiments provide a system for receiving data onboard an aircraft. The system includes: a system memory element; an aircraft transponder, configured to receive a plurality of transponder messages associated with a particular landing zone; and at least one processor, communicatively coupled to the system memory element and the aircraft transponder, the at least one processor configured to: analyze each of the plurality of transponder messages; identify aircraft position data associated with landing at least one lead aircraft at the particular landing zone, based on analyzing each of the plurality of transponder messages; and determine a landing path for landing the aircraft at the particular landing zone, based on the identified aircraft position data.

Some embodiments provide a non-transitory, computer-readable medium containing instructions thereon, which, when executed by a processor, perform a method. The method receives, via a transponder onboard an aircraft, landing path data for a particular landing zone; identifies a current position of the aircraft using avionics systems onboard the aircraft; and determines lateral guidance and vertical guidance for the aircraft, based on the landing path data and the current position of the aircraft.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The present disclosure presents methods and apparatus for determining landing guidance using data provided in received aircraft transponder messages, such as those received via Automatic Dependent Surveillance—Broadcast (ADS-B). Aircraft transponder messages generally include aircraft position data, and are received by aircraft within communication range of the reference aircraft. Aircraft position data for one or more reference aircraft (e.g., aircraft that have already landed at a particular location) are collected and used to compute a reference landing path and/or to determine appropriate lateral and vertical deviation for a second aircraft landing at the same location.

Certain terminologies are used with regard to the various embodiments of the present disclosure. A landing zone may refer to an airport, a particular runway, or any other surface at which an aircraft may land. A reference aircraft or lead aircraft is an aircraft that has already landed at a particular location, and which transmits aircraft transponder messages that include position data which may be used to calculate a reference landing path for the particular location. Aircraft position data extracted from the transponder messages may include latitude and longitude, heading, velocity, and altitude of the lead aircraft. Vertical deviation and lateral deviation refer to the divergence of an aircraft from the theoretical aircraft positions of a reference landing path.

Figure 1:
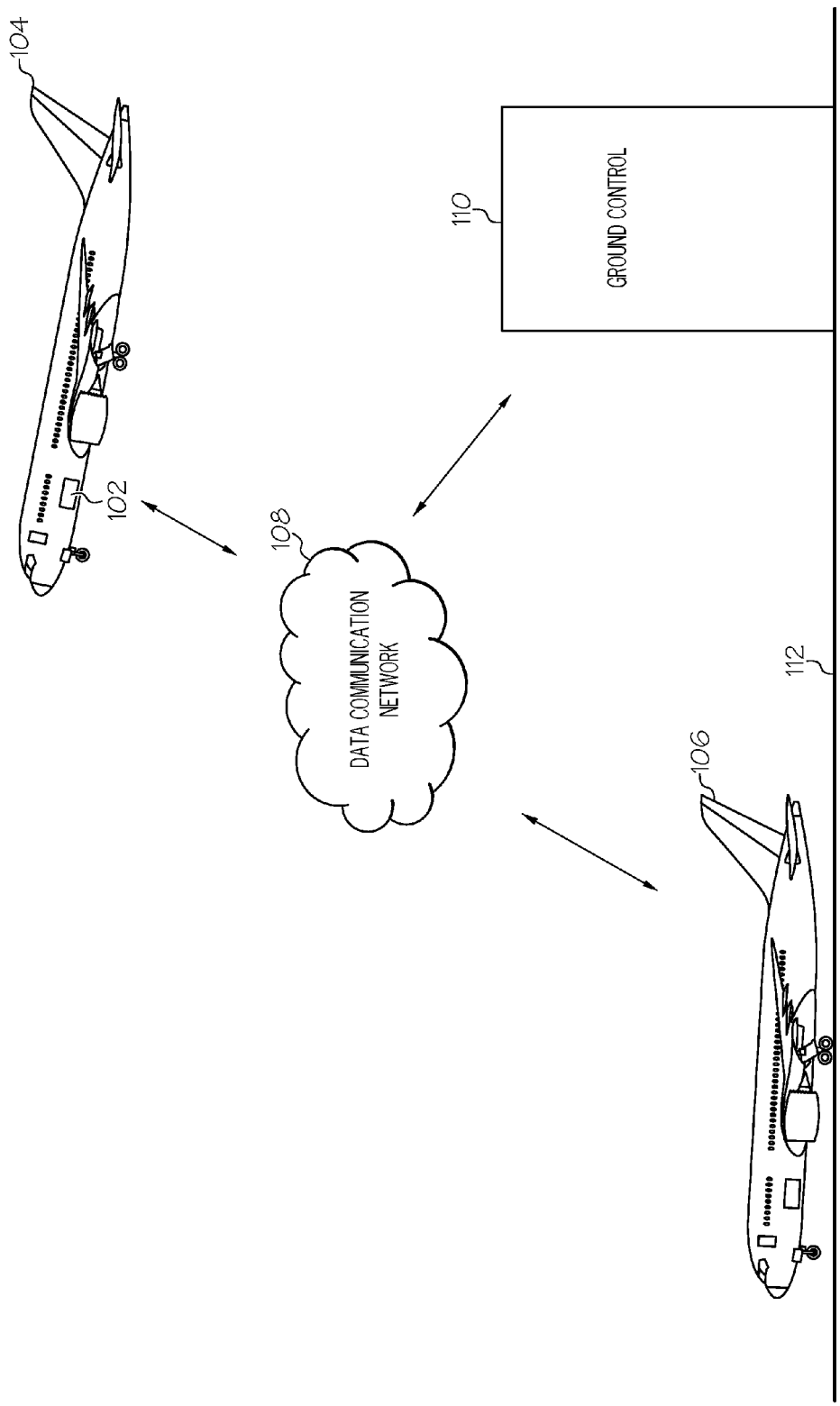
FIG. 1 is a diagram of an aircraft landing guidance system in operation, in accordance with the disclosed embodiments.

Turning now to the figures, FIG. 1 is a diagram of an aircraft landing guidance system in operation, in accordance with the disclosed embodiments. As shown, operation of a landing guidance system generally includes, without limitation: a landing guidance system 102 onboard an aircraft 104 in communication with a reference aircraft, or in other words, a lead aircraft 106 and/or ground control 110. The aircraft 104 and the lead aircraft 106 may be implemented by any fixed-wing or rotary aircraft, such as an airplane, helicopter, space shuttle, drone, or other aircraft equipped with the capability to communicate with other aircraft and ground control 110. Ground control 110 is an air traffic control tower or other ground-based airport control center capable of communication with the aircraft 104 and the lead aircraft 106.

The landing guidance system 102 may transmit data to, and receive data from, the lead aircraft 106 and/or ground control 110 via a data communication network 108. The data communication network 108 may be any digital or other communications network capable of transmitting messages or data between devices, systems, or components. In certain embodiments, the data communication network 108 may include any network that includes broadcast transmission capabilities, such as a transponder datalink (e.g., an Automatic Dependent Surveillance—Broadcast (ADS-B), Automatic Dependent Surveillance—Rebroadcast (ADS-R), Traffic Information Service—Broadcast (TIS-B), or voice VHF/HF broadcast used for Precision Approach Radar approaches).

In certain embodiments, the data communication network 108 includes a packet switched network that facilitates packet-based data communication, addressing, and data routing. The packet switched network could be, for example, a wide area network, the Internet, or the like. In various embodiments, the data communication network 108 includes any number of public or private data connections, links or network connections supporting any number of communications protocols. The data communication network 108 may include the Internet, for example, or any other network based upon TCP/IP or other conventional protocols. In various embodiments, the data communication network 108 could also incorporate a wireless and/or wired telephone network, such as a cellular communications network for communicating with mobile phones, personal digital assistants, and/or the like. The data communication network 108 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

During flight, the aircraft 104 and the lead aircraft 106 each periodically transmit aircraft transponder messages via the data communication network 108. These aircraft transponder messages are received by all transponder-equipped aircraft, and/or ground control, that are within range of the transmitting transponder. In embodiments using an ADS-B transponder, a typical range for communication is 120-200 Nautical Miles (NM), and ADS-B transponder messages are transmitted every second. Each transponder message includes position data for the transmitting aircraft. As shown, the lead aircraft 106 is landing (or has landed) at a landing zone 112. The aircraft 104 is in the air, and receives aircraft transponder messages from the lead aircraft 106 which include position data for the lead aircraft 106. Here, the aircraft 104 uses the landing guidance system 102 to analyze the aircraft transponder messages to extract position data and to determine appropriate landing guidance for the aircraft 104 to use during landing at the landing zone 112.

Figure 2:
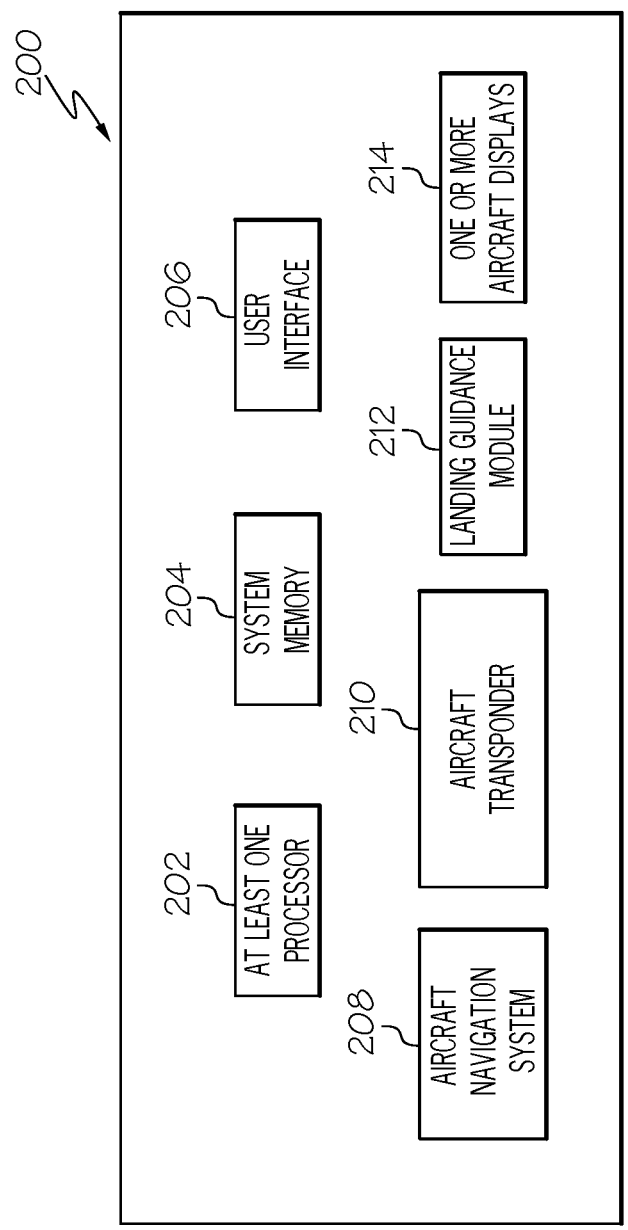
FIG. 2 is a functional block diagram of an aircraft landing guidance system, in accordance with the disclosed embodiments.

FIG. 2 is a functional block diagram of an aircraft landing guidance system 200, in accordance with the disclosed embodiments. It should be noted that the aircraft landing guidance system 200 can be implemented with the landing guidance system 102 depicted in FIG. 1. In this regard, the aircraft landing guidance system 200 shows certain elements and components of the landing guidance system 102 in more detail. The aircraft landing guidance system 200 generally includes, without limitation: at least one processor 202; system memory 204; a user interface 206; an aircraft navigation system 208; at least one aircraft transponder 210; a landing guidance module 212; and one or more aircraft display devices 214. These elements and features of the aircraft landing guidance system 200 may be operatively associated with one another, coupled to one another, or otherwise configured to cooperate with one another as needed to support the desired functionality—in particular, obtaining landing guidance, as described herein. For ease of illustration and clarity, the various physical, electrical, and logical couplings and interconnections for these elements and features are not depicted in FIG. 2. Moreover, it should be appreciated that embodiments of the aircraft landing guidance system 200 will include other elements, modules, and features that cooperate to support the desired functionality. For simplicity, FIG. 2 only depicts certain elements that relate to the techniques for obtaining landing guidance, as described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 communicates with system memory 204. The system memory 204 may be used to store received aircraft transponder messages, aircraft position data extracted from aircraft transponder messages, and/or landing guidance data. The system memory 204 may be realized using any number of devices, components, or modules, as appropriate to the embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the at least one processor 202. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the landing guidance system 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the landing guidance system 200. For example, the user interface 206 could be manipulated by an operator to make menu selections for purposes of using received aircraft position data for a lead aircraft that has already landed in order to determine appropriate landing guidance for landing the second aircraft.

In certain embodiments, the user interface 206 may include or cooperate with various features to allow a user to interact with the landing guidance system 200 via graphical elements rendered on a display element. Accordingly, the user interface 206 may initiate the creation, maintenance, and presentation of a graphical user interface (GUI). In certain embodiments, the display element implements touch-sensitive technology for purposes of interacting with the GUI. Thus, a user can manipulate the GUI by moving a cursor symbol rendered on the display element, or by physically interacting with the display element itself for recognition and interpretation, via the user interface 206.

The aircraft navigation system 208 is suitably configured to obtain one or more navigational parameters associated with operation of the aircraft. The aircraft navigation system 208 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the aircraft navigation system 208, as will be appreciated in the art. In an exemplary embodiment, the aircraft navigation system 208 is capable of obtaining and/or determining the instantaneous position of the aircraft, that is, the current location of the aircraft (e.g., the latitude and longitude) and the altitude or above ground level for the aircraft. In some embodiments, the aircraft navigation system 208 may also obtain and/or determine the heading of the aircraft (i.e., the direction the aircraft is traveling in relative to some reference). In the context of the present disclosure, the aircraft navigation system 208 is generally used to determine current positioning of the aircraft so that vertical and lateral deviation may be determined and flight guidance may be provided (by the landing guidance module 212).

The at least one aircraft transponder 210 is configured to send and receive broadcast messages via transponder data link. The aircraft transponder 210 may be implemented using any transponder device which may transmit broadcast messages which may be received by other aircraft and/or a ground control center within a range of communication. Exemplary embodiments of the aircraft transponder 210 may be implemented using an Automatic Dependent Surveillance—Broadcast (ADS-B), which may be received by surrounding aircraft and a ground control center. An ADS-B Out transmitter (located onboard the aircraft) periodically broadcasts information about each aircraft, to include, without limitation: aircraft identification, current aircraft position, altitude, and/or velocity. The ADS-B Out broadcast messages of a lead aircraft (as described above with regard to FIG. 1) provide real-time position information, which may be received via an ADS-B In receiver of a second aircraft. The second aircraft may retain, store, and interpret the received ADS-B messages to determine landing guidance for a particular landing zone (e.g., a particular airport, a particular runway, etc.). The at least one aircraft transponder 210 may receive transponder messages transmitted from other aircraft and/or a ground control station within transmission range. In other words, the at least one aircraft transponder 210 may receive transponder messages via aircraft-to-aircraft communication and/or ground control-to-aircraft communication.

The landing guidance module 212 is configured to analyze a plurality of received aircraft transponder messages (received by the aircraft transponder 210) to obtain data associated with a series of aircraft positions for a reference aircraft during landing at a particular location. The series of aircraft positions may be obtained from one reference aircraft that has landed at the particular location, or a plurality of reference aircraft that have landed at the particular location. The landing guidance module 212 uses the data associated with the series of aircraft positions to compute a reference landing path for other aircraft to use during landing at the particular location, and to calculate lateral and vertical deviation which may be used by other aircraft during landing at the particular location.

In practice, the landing guidance module 212 may be implemented with (or cooperate with) the at least one processor 202 to perform at least some of the functions and operations described in more detail herein. In this regard, the landing guidance module 212 may be realized as suitably written processing logic, application program code, or the like. In certain embodiments, the landing guidance module 212 may cooperate with an onboard flight management system (FMS), an electronic flight bag (EFB), or other aircraft system to compute lateral deviation and vertical deviation values and/or to determine flight guidance instructions for the aircraft.

The one or more aircraft display devices 214 are configured to display various icons, text, and/or graphical elements associated with vertical deviation, lateral deviation, and/or other position-based landing guidance for an aircraft. In an exemplary embodiment, the one or more aircraft display devices 214 are communicatively coupled to the user interface 206. The user interface 206 is communicatively coupled to the at least one processor 202, and the at least one processor 202 and the user interface 206 are cooperatively configured to display, render, or otherwise convey one or more graphical representations or images associated with landing guidance on the one or more aircraft display devices 214, as described in greater detail below. In an exemplary embodiment, the one or more aircraft display devices 214 are realized as an electronic display configured to graphically display landing guidance data. In some embodiments, the one or more aircraft display devices 214 is located within a cockpit of the aircraft. It will be appreciated that although the one or more aircraft display devices 214 may be implemented using a single aircraft display device, certain embodiments may use additional display devices to accomplish the functionality of the one or more aircraft display devices 214 described herein.

Figure 3:
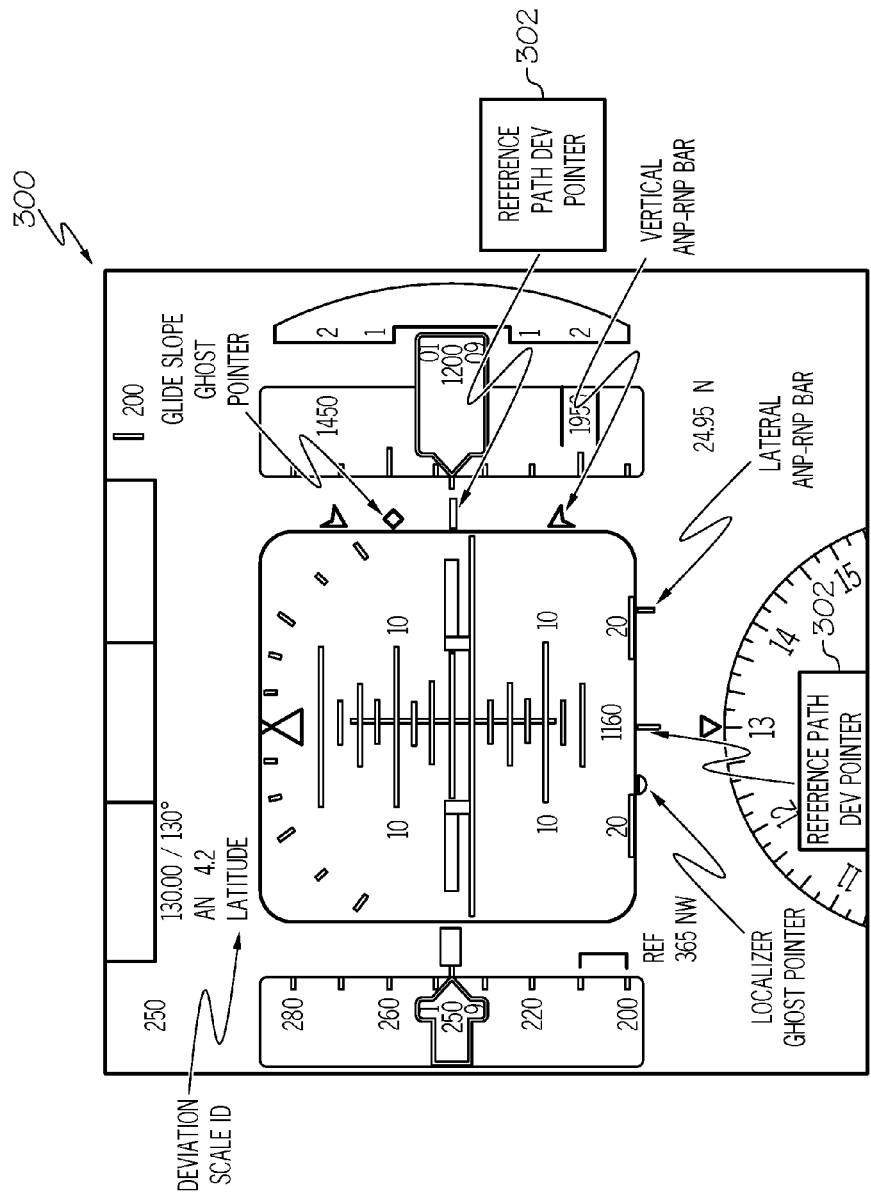
FIG. 3 is an aircraft display for presenting deviation data, in accordance with the disclosed embodiments.

FIG. 3 is an aircraft display 300 for presenting deviation data, in accordance with the disclosed embodiments. The aircraft display 300 may be implemented using a standard display, which is generally located in an aircraft cockpit and/or on the flight deck of an aircraft. As shown, the aircraft display 300 presents lateral deviation and vertical deviation using reference path deviation pointers 302. A three-dimensional (3D) trajectory for a lead aircraft that has already landed at a particular location is received via aircraft transponder messages and used to compute a reference path for landing a second aircraft at that particular location. During flight, the aircraft display 300 is used as primary flight Display (PFD). The center of the PFD usually contains an attitude indicator (AI), which gives the pilot information about the aircraft's pitch and roll characteristics, and the orientation of the aircraft with respect to the horizon. To the left and right of the attitude indicator are usually the airspeed and altitude indicators, respectively. The airspeed indicator displays the speed of the aircraft in knots, while the altitude indicator displays the aircraft's altitude above mean sea level (AMSL). The vertical speed indicator, usually next to the altitude indicator, indicates to the pilot how fast the aircraft is ascending or descending, or the rate at which the altitude changes. At the bottom of the PFD is the heading display, which shows the pilot the magnetic heading of the aircraft. Other information displayed on the PFD includes navigational marker information, bugs (to control the autopilot), ILS glideslope indicators, course deviation indicators, altitude indicator QFE settings, and much more. When the aircraft adheres to the reference landing path, the reference path deviation pointer 302 is not displayed. When the aircraft does not adhere to the reference landing path, or in other words, when the aircraft deviates from the reference landing path, the reference path deviation pointer 302 is displayed on display 300. The flight crew can align the aircraft to reference path based on the deviation pointer.

Figure 4:
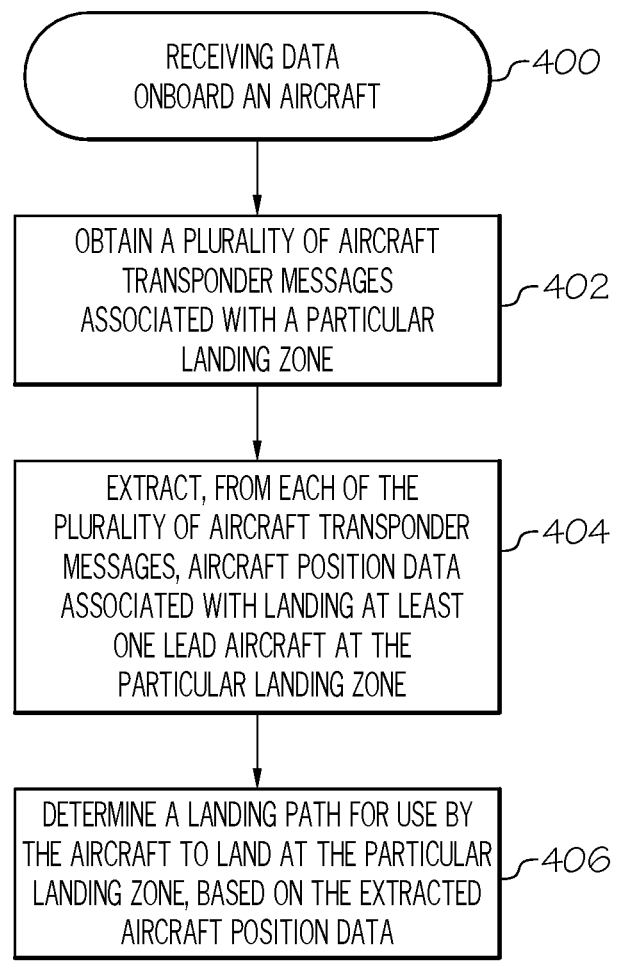
FIG. 4 is a flow chart that illustrates an embodiment of a process for receiving data onboard an aircraft.

FIG. 4 is a flow chart that illustrates an embodiment of a process 400 for receiving data onboard an aircraft. The various tasks performed in connection with process 400 may be performed by software, hardware, firmware, or any combination thereof. For illustrative purposes, the following description of process 400 may refer to elements mentioned above in connection with FIGS. 1-3. In practice, portions of process 400 may be performed by different elements of the described system, e.g., an aircraft transponder, a one or more aircraft displays, and/or a processor configured to operate in conjunction with other elements of the described system. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

For ease of description and clarity, it is assumed that the process 400 begins by obtaining a plurality of aircraft transponder messages associated with a particular landing zone (step 402). A landing zone may refer to an airport, a particular runway, or any other surface on which an aircraft may land. Each of the transponder messages is received from an aircraft that has landed at the landing zone. For purposes of the present disclosure, a transponder message (e.g., an ADS-B message) is a data broadcast from a first aircraft to a plurality of other aircraft and/or a ground control center. Transponder messages may include, without limitation: aircraft identification, current aircraft position, altitude, and/or velocity.

Next, the process 400 extracts, from each of the plurality of aircraft transponder messages, aircraft position data associated with landing at least one lead aircraft at the particular landing zone (step 404). Aircraft position data extracted from the transponder messages may include latitude and longitude, altitude, heading, velocity, and altitude of the lead aircraft. This aircraft position data may be associated with particular locations as the lead aircraft lands, and may be extracted from a series of transponder messages broadcast from the lead aircraft during the landing process.

The process 400 then determines a landing path for use by the aircraft to land at the particular landing zone, based on the extracted aircraft position data (step 406). Here, the process 400 receives each of the transponder messages from a lead or reference aircraft that has landed at the landing zone. Transponder messages transmitted by the lead aircraft may be collected and stored by a second aircraft and, when the lead aircraft has landed at a particular landing zone, the collected transponder messages may be analyzed to obtain a series of aircraft positions, each of the series of aircraft positions comprising latitude, longitude, and altitude information. The landing zone data that includes the runway position, runway length is extracted from the onboard available database. The process 400 computes a reference landing path using the series of aircraft positions and the landing zone data. The reference landing path may then be used as landing guidance for the second aircraft.

In certain embodiments, the process 400 uses all received lead aircraft transponder messages (and thus, all received lead aircraft position data) to compute the reference landing path. In some embodiments, however, the process 400 filters the received lead aircraft transponder messages and uses a subset of the received lead aircraft transponder messages to compute the reference landing path. The subset may be associated with a particular aircraft type, a particular weight-load balance, and/or particular aircraft dimensions. For example, the aircraft seeking landing guidance may be a Type A aircraft. Although the aircraft receives lead aircraft transponder messages transmitted by all aircraft (and/or ground control stations) within transmission range of the aircraft, the aircraft filters the received lead aircraft transponder messages to identify the lead aircraft transponder messages transmitted by other Type A aircraft.

In some embodiments, the process 400 identifies a subset of the received lead aircraft transponder messages associated with excessive deviation, and eliminates the subset in order to eliminate excessive deviation from the calculation of a reference landing path. In this situation, the received lead aircraft position data (which has been extracted from the lead aircraft transponder messages) includes the subset of position data comprising outliers, or lead aircraft position data that deviates from the remainder of the lead aircraft position data. Here, the process 400 eliminates the subset (i.e., the outliers), and computes the reference landing path using the remainder of the lead aircraft position data.

In some embodiments, lead aircraft transponder messages are received from a single lead aircraft, and the reference landing path is determined using a single set of lead aircraft position data transmitted during landing of the lead aircraft. However, in some embodiments, lead aircraft transponder messages are received from a plurality of lead aircraft. In this situation, a plurality of sets of lead aircraft position data are extracted from the lead aircraft transponder messages, and this plurality of sets of lead aircraft position data may be averaged to compute a "mean", or average, reference landing path.

Figure 5:
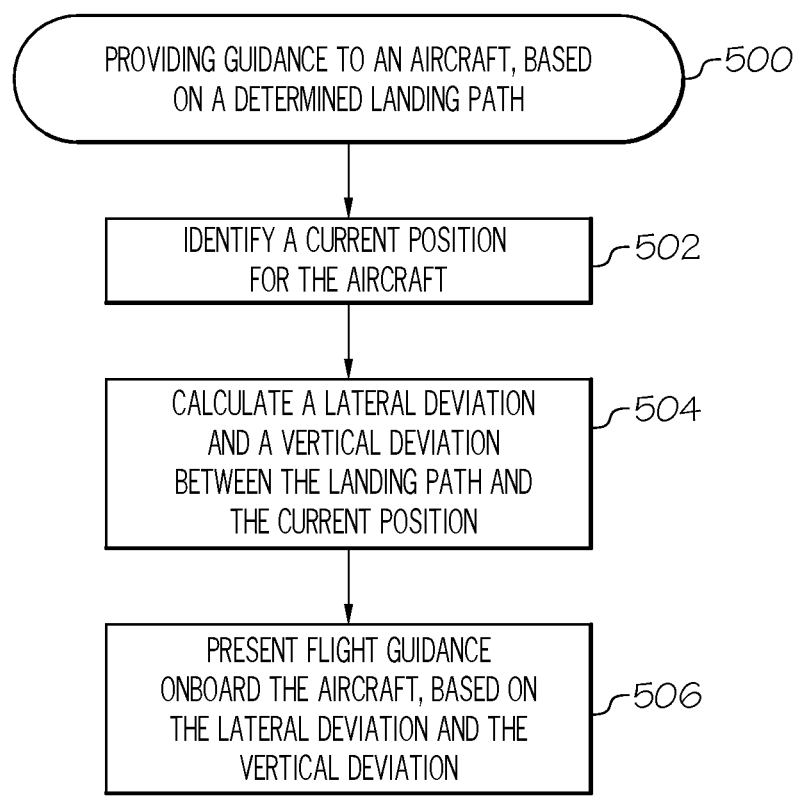
FIG. 5 is a flow chart that illustrates an embodiment of a process for providing guidance to an aircraft, based on a determined landing path.

FIG. 5 is a flow chart that illustrates an embodiment of a process 500 for providing guidance to an aircraft, based on a determined reference landing path. First, the process 500 identifies a current position for the aircraft (step 502). Here, the process 500 obtains latitude, longitude, and altitude values associated with the current position of the aircraft. The current position may be determined using a global positioning system (GPS) device, an inertial navigation system (INS), and/or other navigation system or other available position sensors onboard the aircraft.

Next, the process 500 calculates a lateral deviation and a vertical deviation between the reference landing path and the current position (step 504). Lateral deviation may be defined as the difference between a current, lateral position of the aircraft and a theoretical lateral position indicated by the computed reference landing path. Similarly, vertical deviation may be defined as the difference between a current altitude of the aircraft and a theoretical altitude indicated by the computed reference landing path.

The process 500 then presents flight guidance onboard the aircraft, based on the lateral deviation and the vertical deviation (step 506). Flight guidance may include instructions for the flight crew to use to bring the current position of the aircraft into conformity with the theoretical reference landing path. Flight guidance may be presented in the form of lateral guidance and vertical guidance. Here, the process 500 uses a display to present the deviation information. In certain embodiments, the process 500 presents the lateral deviation and vertical deviation data via a primary flight display (PFD) and/or a navigational display. However, it should be appreciated that the process 500 may present the lateral deviation and vertical deviation data via any other display capable of presenting the deviation data. In some embodiments, the process 500 may use a cockpit display of traffic information (CDTI) or a multifunction display to depict the guidance cues.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for receiving data onboard a second aircraft, the method comprising:

obtaining, by the second aircraft, a plurality of aircraft transponder messages associated with a particular landing zone during flight of the second aircraft;

extracting, from each of the plurality of aircraft transponder messages, lead aircraft position data associated with landing at least one lead aircraft at the particular landing zone, wherein the at least one lead aircraft has landed at the particular landing zone; and determining a landing path for use by the second aircraft to land at the particular landing zone, based on the extracted aircraft position data, by:

averaging the lead aircraft position data of the at least one lead aircraft; and determining a mean landing path, based on the averaging, wherein the landing path comprises the mean landing path.

2. The method of claim 1, wherein obtaining the plurality of aircraft transponder messages further comprises:

receiving the plurality of aircraft transponder messages via aircraft-to-aircraft communication.

3. The method of claim 1, wherein obtaining the plurality of aircraft transponder messages further comprises:

receiving the plurality of aircraft transponder messages via ground control-to-aircraft communication.

4. The method of claim 1, further comprising:

identifying a current position for the second aircraft;

calculating a lateral deviation and a vertical deviation between the landing path and the current position; and presenting flight guidance onboard the second aircraft, based on the lateral deviation and the vertical deviation.

5. The method of claim 1, further comprising:

selecting, from the plurality of aircraft transponder messages, a subset associated with a particular aircraft type; and determining the landing path using the subset.

6. The method of claim 1, further comprising:

selecting, from the plurality of aircraft transponder messages, a subset associated with a particular weight-load balance for the at least one lead aircraft; and determining the landing path using the subset.

7. The method of claim 1, further comprising:

selecting, from the plurality of aircraft transponder messages, a subset associated with particular aircraft dimensions; and determining the landing path using the subset.

8. The method of claim 1, wherein the second aircraft and the at least one lead aircraft are equipped with Automatic Dependent Surveillance-Broadcast (ADS-B) transponders;

wherein the aircraft transponder messages comprise ADS-B Out messages; and wherein the second aircraft receives the aircraft transponder messages via ADS-B In.

9. The method of claim 1, wherein the landing path comprises a series of positions associated with landing the at least one lead aircraft at the particular landing zone, wherein each of the series of positions comprises a latitude, a longitude, and an altitude.

10. A system for receiving data onboard a second aircraft, the system comprising:

a system memory element;

an aircraft transponder, configured to receive a plurality of transponder messages associated with a particular landing zone during flight of the second aircraft; and at least one processor, communicatively coupled to the system memory element and the aircraft transponder, the at least one processor configured to:

analyze each of the plurality of transponder messages;

identify lead aircraft position data associated with landing at least one lead aircraft at the particular landing zone, based on analyzing each of the plurality of transponder messages, wherein the at least one lead aircraft has landed at the particular landing zone; and determine a landing path for landing the second aircraft at the particular landing zone, based on the identified lead aircraft position data, by:

calculating an average of the lead aircraft position data of the at least one lead aircraft; and determining a mean landing path, based on the average, wherein the landing path comprises the mean landing path.

11. The system of claim 10, wherein the aircraft transponder comprises an Automatic Dependent Surveillance-Broadcast (ADS-B);

wherein the aircraft transponder messages comprise ADS-B Out messages; and wherein the second aircraft receives the aircraft transponder messages via ADS-B In.

12. The system of claim 10, wherein the landing path comprises a series of positions associated with landing the at least one lead aircraft at the particular landing zone, wherein each of the series of positions comprises a latitude, a longitude, and an altitude; and wherein the at least one processor is further configured to:

identify current position for the second aircraft, the current position comprising a current latitude, a current longitude, and a current altitude;

calculate a lateral deviation and a vertical deviation between one of the series of positions of the landing path and the current position; and present flight guidance onboard the second aircraft, based on the lateral deviation and the vertical deviation.

13. The system of claim 10, wherein the at least one processor is further configured to:

select, from the plurality of transponder messages, a subset associated with a particular type of aircraft; and determine the landing path using the subset.

14. A non-transitory, computer-readable medium containing instructions thereon, which, when executed by a processor, perform a method comprising:

receiving, via a transponder onboard a second aircraft, landing path data for a particular landing zone, wherein the landing path data comprises lead aircraft position data included in transponder messages broadcast by at least one lead aircraft that has landed at the particular landing zone, and wherein the transponder messages are received via the transponder during flight of the second aircraft;

identifying a current position of the second aircraft using avionics systems onboard the aircraft; and determining lateral guidance and vertical guidance for the second aircraft, based on the landing path data and the current position of the second aircraft, by:

averaging the lead aircraft position data of the at least one lead aircraft; and determining a mean landing path, based on the averaging, wherein lateral guidance and vertical guidance comprise the mean landing path.

15. The non-transitory, computer-readable medium of claim 14, wherein determining the lateral guidance and the vertical guidance further comprises:

calculating a lateral deviation between a current lateral position of the second aircraft and a required lateral position, wherein the current position comprises the current lateral position, and wherein the landing path data comprises the required lateral position; and calculating a vertical deviation between a current vertical position of the second aircraft and a required vertical position, wherein the current position comprises the current vertical position, and wherein the landing path data comprises the required vertical position.

16. The non-transitory, computer-readable medium of claim 14, wherein the lateral guidance and vertical guidance are determined by a flight management system (FMS) onboard the second aircraft.

17. The non-transitory, computer-readable medium of claim 14, wherein the lateral guidance and vertical guidance are determined using an electronic flight bag (EFB) associated with the second aircraft.

18. The non-transitory, computer-readable medium of claim 14, wherein the method further comprises:

identifying a subset of the landing path data associated with excessive deviation;

eliminating the subset from the landing path data, wherein the landing path data comprises the subset and a remainder; and determining the lateral guidance and the vertical guidance using the remainder.

* * * * *